June 2, 1970  L. J. METHENY ET AL  3,515,503

PUMP STRUCTURE

Original Filed May 23, 1968

INVENTORS
LARRY J. METHENY
JOSEPH R. MIHELICK
BY
*Hood, Gust, Irish & Lundy*
ATTORNEYS

United States Patent Office 3,515,503
Patented June 2, 1970

3,515,503
PUMP STRUCTURE
Larry J. Metheny and Joseph R. Mihelick, Columbus, Ind., assignors to Reliance Electric Company, a corporation of Delaware
Original application May 23, 1968, Ser. No. 731,487, now Patent No. 3,482,651. Divided and this application Sept. 4, 1969, Ser. No. 855,186
Int. Cl. F04b 19/22; F16n 21/00
U.S. Cl. 417—559   11 Claims

ABSTRACT OF THE DISCLOSURE

A pump comprising a housing member formed with a centrally located cavity in one generally flat face thereof, the cavity defining a perimetrally extending mounting boss, a first bore extending therethrough and generally perpendicularly to the said one face and providing a first valve seat facing the said one face, a second bore extending therethrough and generally parallel to the first bore and providing a second valve seat facing away from the said one face, and a third bore extending therethrough and generally parallel to the first bore, a plunger arranged for axial reciprocation in the third bore, and a plate mounted on the perimetrally extending mounting boss and covering the cavity to define a pump chamber into which the bores open. A spring urged valve member engages each valve seat and a spring is provided for yieldably urging the plunger away from the pump chamber.

---

This is a divsion of our copending application Ser. No. 731,487 filed May 23, 1968, now Pat. No. 3,482,651.

It is a primary object of our invention to provide a pump which is ideally suited for use as a lubrication pump for a gear motor of the type having a plurality of transmission elements disposed in a liquid-tight chamber or housing. Particularly, we have provided a pump which is proportioned and designed to be usable with a wide variety of types of gear motors and lubricating fluids, which occupies a minimum amount of space as compared to its delivery capability, which is insensitive to the direction of rotation of its driver, which is inexpensive to manufacture, which does not require maintenance or adjustment, which provides an output volume substantially proportional to the speed with which it is driven, which is self-priming and capable of holding a prime, which can be used as a suction pump or a pressure pump, and which will provide a unidirectional flow of fluid regardless of the rotational direction of the driver and without secondary valving as normally required in pumps used with gear motors.

The problems involved in providing lubrication pumps for gear motors are well known. If a sufficient quantity of lubricating fluid is not properly circulated to flow over the transmission elements, the transmission will simply wear out and have to be replaced. Since the many and various applications for gear motors require many different output speeds, the lubrication problems vary to such an extent that, heretofore, it has been a problem to find a pump which will meet the wide range of requirements. For instance, if a particular vane-type pump is proportioned and designed to operate properly when driven by one rotatable element of the transmission, this same pump may not work properly in another gear motor when that rotatable element is driven at a different speed.

It is also well known that the gear motor field is a highly competitive one and that the cost of each subassembly comprising the motor, including its lubrication pump, must be kept at an absolute minimum. We have, therefore, provided a pump which has a minimum number of moving parts and which can be manufactured using tolerances greater than standard manufacturing tolerances. The heart of our pump is preferably a die cast housing member which is formed about a metal sleeve which provides a pump cylinder. Also, preferably, to conserve space, our plunger is formed with an axially-extending hollow and our plunger spring is disposed in that hollow yieldably to urge the plunger toward its driver.

Our pump is so small and inexpensive to manufacture that, when a gear motor requires greater pumping capacity than one of our pumps is capable of providing, we can economically mount two or more of the pumps on a gear motor housing so that they can be driven by the same or different drivers.

It is an object of our invention, therefore, to provide such a simply constructed, inexpensive pump particularly designed for solving the problems involved in the lubrication of gear motors.

A further object of our invention is to provide such a pump which will operate satisfactorily and at a sufficiently low speed to be used in the lubrication of a gear motor.

A further object of our invention is to provide such a pump which will give unidirectional flow to the lubricant regardless of the direction of rotation of the driver and without requiring secondary valving.

Still a further object of our invention is to provide a pump which has the capability, without requiring modification of any kind, to induce a flow of lubricant either by causing a partial vacuum in a space or by increasing the pressure within that space.

Yet another object of our invention is to provide such a pump which is self-priming and which will hold its prime.

Another object of our invention is to provide such a pump having a delivery capability which is substantially proportional to the speed at which its plunger is driven, thus giving more lubricant for higher speed operation.

Finally, it is an object of our invention to provide a pump which is reliable, and which requires no maintenance or adjustment.

Other objects and features of our invention will become apparent as this description proceeds.

To the accomplishment of the above and related objects, our invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
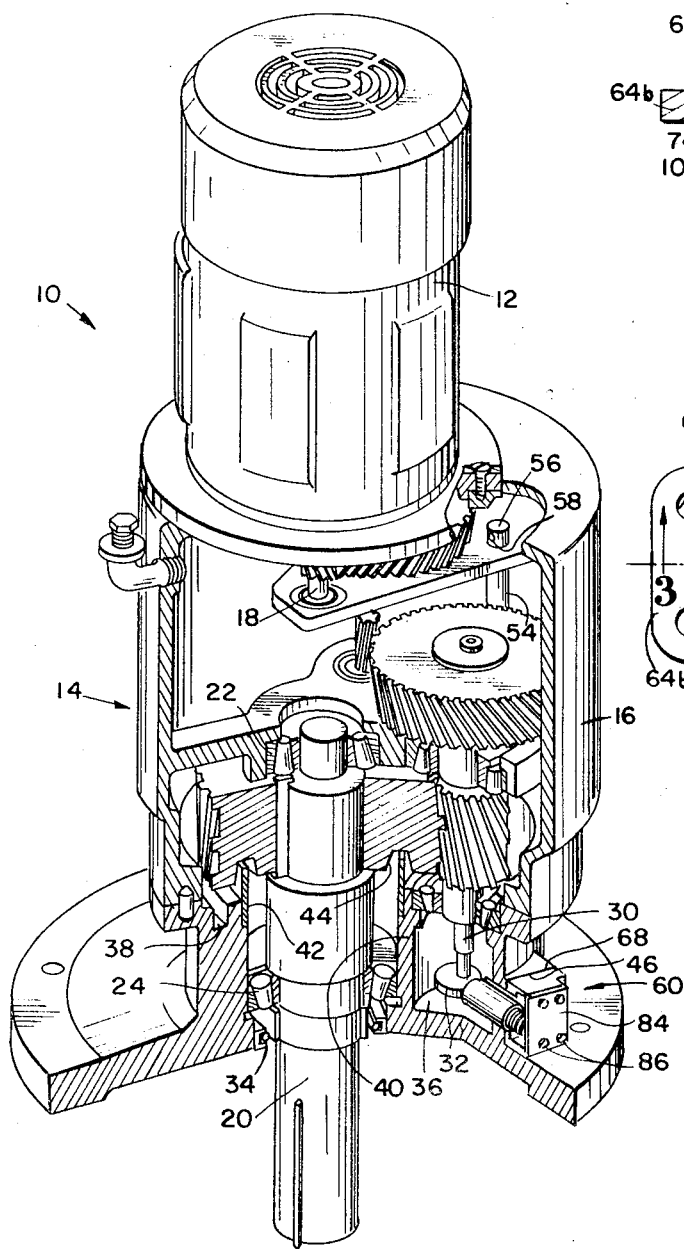
FIG. 1 is a perspective view, partially cut away, of a gear motor with our pump mounted thereon and arranged to circulate lubricating fluid in the transmission housing thereof.

Referring now to FIG. 1, it will be seen that we have illustrated a gear motor 10 comprising a conventional electric motor 12 and a transmission system 14 which is enclosed in a housing 16 defining a liquid-tight chamber for containing the transmission elements and the lubricating fluid for the elements. The housing 16 may be formed in any number of ways. For instance, the illustrated housing 16 is formed of three separate castings (no reference numbers applied) which are fastened together by conventional fastening means. Conventionally, an input shaft 18 and an output shaft 20 are journalled in the housing 16, the shaft 18, in the illustrative embodiment, comprising the output shaft of the motor 12. The output shaft 20 is, in the illustrative embodiment, journalled by means of conventional tapered roller bearings 22, 24. The two shafts 18, 20 are drivingly connected by a plurality of spiral or helical gears (no reference numerals applied) arranged in a conventional manner to provide a speed reduction between the shaft 18 and the shaft 20. It is well known that these gears must be adequately lubricated continually during operation or they will wear out and fail.

In the illustrative embodiment, a selected one of the abovementioned gears may be mounted on a shaft 30 which carries a cam 32 which serves as a driver for our pump, as will be more fully explained hereinafter.

The gear motor 10 of FIG. 1 is a "dry-seal system" in which the bearing 24 and the seal 34 thereunder are run dry, i.e., without being flooded with the lubricating fluid circulated over the rest of the transmission elements. This condition is obtained by causing the fluid flowing downwardly over the transmission elements to flow downwardly into the reservoir 36 from which it is pumped upwardly without permitting it to flow into the space in which the bearing 24 and seal 34 are disposed. Specifically, the fluid delivered by the pump to the upper part of the housing 16 is caught in a trough 38 which leads to the reservoir 36. The housing 16, is formed with a wall portion 40 peripherally surrounding the shaft 20 above the bearing 24 and an annular shield 42 is carried by the wall portion 40 concentric with the shaft 20, the upper peripheral edge of the shield extending into an annular slot formed in the lower face of one of the abovementioned gears. The level of the lubricating fluid in the trough 38 and reservoir 36 is lower than the upper edge of the shield 42 so that there is no significant tendency for lubricant to pass the shield.

In such a system, the pump must begin immediately to pump fluid from the reservoir 36 upwardly onto the gears in the transmission system. If, for some reason, the pump does not begin immediately to circulate the fluid, the teeth of the gears will wear a little bit each time the gear motor is started after it has sat long enough to permit all of the fluid to drain into the reservoir 36. Thus, the pump, to be effective, must maintain prime.

Figure 1A:
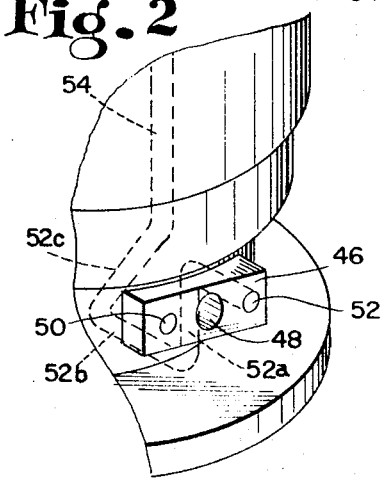
FIG. 1a is a fragmentary perspective view showing the surface on which the pump is mounted and the manner in which the delivery port of the pump is connected to the upstanding delivery tube.

As illustrated in FIG. 1a, the housing 16 is preferably provided with an exterior mounting surface 46 having openings 48, 50, 52 therein which communicate with the interior of the housing 16. Specifically, the openings 48, 50 communicate directly with the space of the reservoir 36 and the opening 52 is in communication with the interior of the housing 16 through a series of passageways 52a, 52b, 52c formed in the casting of the housing 16 and leading to tube 54 extending vertically upwardly from the base of the casting. The upper end of the tube 54 is sealed off by means of a cap 56 and at least one hole 58 is provided in the wall of the tube. This hole 58 serves to deliver a stream of lubricating fluid when the pump is operated. As a matter of convenience, the upper end of the tube 54 may be anchored in, i.e., extend into, an opening in the upper portion of the housing 16.

It will be understood that the passageways 52a, 52b, 52c shown in FIG. 1a are merely suggestive and that any number of methods may be utilized for connecting the tube 54 to the opening 52.

Our pump, indicated generally by the reference numeral 60, is mounted on the apertured mounting surface 46. The pump 60 comprises a housing member 62 formed with a generally flat flange portion 64 and a boss 66 extending outwardly from one side of the flange portion. In the illustrative embodiment, the flange portion 64 provides a pair of laterally extending mounting flanges 64a, 64b, each of which is provided with a pair of openings 65 through which mounting screws for securing the pump 60 to the housing 16 can extend. In FIG. 1, it will be seen that the generally flat surface 68 of the housing member 62 abuts the generally flat mounting surface 46.

Figure 3:
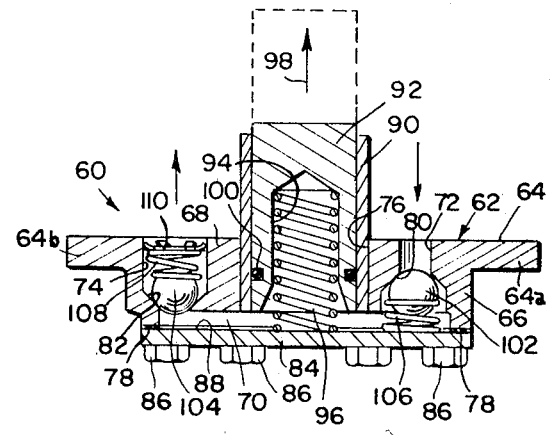
FIG. 3 is a sectional view taken from FIG. 2 generally along the line 3—3.
Figure 2:
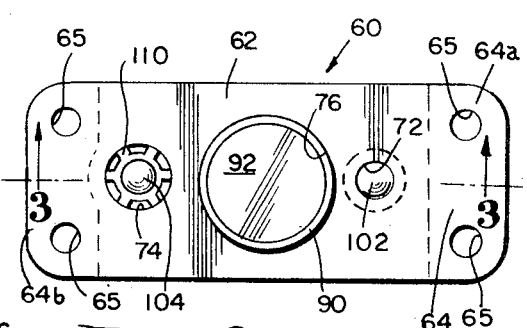
FIG. 2 is an elevational view, enlarged, of the pump.

The housing member 62 is further formed with a generally centrally located cavity 70 in the boss 66 and opening away from the flange portion 64 and first, second and third bores 72, 74, 76 extending through the flange portion 64 and the boss 66 between the surface 68 and the cavity 70. The cavity 70 defines a perimetrally extending mounting surface 78 facing away from the flange portion 64; the first bore 72 provides a first valve seat 80 facing away from the surface 68; and the second bore 74 provides a second valve seat 82 facing toward the surface 68. A pump chamber, into which the three bores 72, 74, 76 open, is defined by placing a plate 84 over the cavity 70 formed in the boss 66. This plate 84 is secured to the mounting surface 78 by means such as the illustrated screws 86 and, preferably, a gasket 88 is disposed between the surface 78 and the plate 84. As seen in FIG. 3, the plate 84 is substantially parallel to the surface 68.

In a preferred embodiment of our invention, the housing member 62 is die cast about a metal sleeve 90, the outer surface of which defines the bore 76. The sleeve 90, then, defines a cylinder in which a plunger 92 is arranged for axial reciprocation. Also, preferably, the plunger 92 is provided with an axially extending hollow 94 opening toward the plate 84 and a plunger spring 96 is disposed partially in the hollow to bear against the plate 84 yieldably to urge the plunger in the direction of the arrow 98 away from the pump chamber. Conventionally, an O-ring seal 100 is carried by the plunger 92 to engage the inner periphery of the sleeve 90. We prefer to use a special type of O-ring seal which is known as a Quad Ring.

A ball 102, 104 is arranged sealably to engage each valve seat 80, 82 and a conical spring 106, 108 is arranged yieldably to urge each ball 102, 104 into engagement with its respective valve seat. The base, i.e., the large end, of the spring 106 bears against the plate 84 while its upper end engages the ball 102. A spring washer 110 is arranged frictionally to engage the side wall of the bore 74 to retain the spring 108 in its position illustrated in FIG. 3. The spring 108 is identical to the spring 106. The spring washer 110 merely retains the spring 108 in its position in the bore 74 until the pump 60 is assembled onto the mounting surface 46. When the pump 60 is assembled on the mounting surface 46, the bore 72 is in registry with the opening 50, the bore 74 is in registry with the opening 52 and the bore 76 is in registry with the opening 48. The opening 52 is preferably smaller in diameter than the large end of the bore 74 so that the spring washer 110 will bear against the outer periphery of the opening 52 to retain the spring 108 in its position illustrated in FIG. 3 when a considerable pressure is developed in the chamber 70. In effect, the washer 110 is merely a means for holding the spring 108 and ball 104 in position until the pump 160 can be assembled onto a gear motor where the spring and ball will then be retained by the mounting surface formed on the gear motor.

From the above description, it will be understood that, when the plunger 92 is reciprocated in the sleeve 90, fluid will be drawn into the chamber (cavity 70) through the first bore 72 and pushed out through the second bore 74. The balls 102, 104, of course, act as valve members opening and closing, respectively, the bores 72 and 74. When the pump 60 is mounted on the mounting surface 46 as illustrated in FIG. 1, lubrication fluid is drawn from the reservoir 36 in through the bore 72 past the ball 102 into the cavity 70 and, then, when the plunger 92 is moved in the direction opposite to the arrow 98, the fluid is pushed past the ball 104 through the bore 74, opening 52, passages 52a, 52b, 52c to the tube 54.

Referring to FIG. 1, it will be seen that, when the pump 60 is mounted on the surface 46, the sleeve 90 and the plunger 92 extend through the opening 48 into the reservoir 36. The plunger 92 is, in that position, spring loaded against the outer periphery of the cam 32 which is eccentrically mounted on the shaft 30. Thus, when the cam rotates, the plunger 92 reciprocates.

It will be apparent that the pump 60 is very simple in construction. As stated previously, the housing member 62 is die cast about the metal sleeve 90 and in the die casting process, the first and second bores 72, 74, with their seats 80 and 82, and the cavity 70 are formed. The balls 102, 104 are, preferably, steel balls which are commericaly available and the springs 96, 106, 108 are also, preferably, steel springs which are commercially available. In order to assure proper seating of the balls 102, 104 on their respective valve seats 80, 82, the balls are placed in the seats and taped lightly with a hammer. This manner of seating the balls 102, 104 coupled with the use of the valve springs 106 and 108 and the O-ring 100 produces a pump which is self-priming and which will hold its prime after axial movement of the plunger 92 has ceased.

The pump 60 is very compact as compared to conventional pumps capable of delivering the same output. The combined thickness of the flange portion 64 and the boss 66 is preferably significantly less than the travel of the plunger 92 and, in the illustrative embodiment, is approximately equal to two-thirds the travel of the plunger 92. The cavity 70 is preferably quite shallow in that its depth, in the illustrative embodiment, is only approximately equal to one-eighth of the travel of the plunger 92. We have constructed a pump in accordance with this disclosure which is approximately three and one-fourth inches long and one and one-fourth inches wide and which extends outwardly from the mounting surface 46 less than three-fourths of an inch, including the heads of the screws 86. The plunger 92 of this constructed pump has a travel of approximately three-fourths of an inch and a diameter of approximately three-fourths of an inch. We have tested the pump and have found that its delivery capabilities are as follows:

TEST NO. 1

[Oil viscosity 6,600 SUS]

| Cam, r.p.m. | Stroke (inch) | Volume delivered (gallons 1 hr.) |
|---|---|---|
| 50 | .125 | 0.70 |
| 50 | .250 | 1.50 |
| 50 | .500 | 3.17 |
| 100 | .125 | 1.27 |
| 100 | .250 | 2.85 |
| 100 | .500 | 5.55 |
| 200 | .125 | 2.54 |
| 200 | .250 | 3.45 |
| 200 | .500 | 8.72 |
| 300 | .125 | 3.49 |
| 300 | .250 | 3.50 |
| 300 | .500 | 9.50 |

TEST NO. 2

[Oil viscosity 162 SUS]

| Cam, r.p.m. | Stroke (inch) | Volume delivered (gallons 1 hr.) |
|---|---|---|
| 100 | .125 | 1.25 |
| 100 | .250 | 3.00 |
| 100 | .500 | 6.50 |
| 200 | .125 | 3.00 |
| 200 | .250 | 6.20 |
| 200 | .500 | 12.75 |
| 300 | .125 | 4.50 |
| 300 | .250 | 9.40 |
| 300 | .500 | 19.20 |
| 500 | .125 | 7.50 |
| 500 | .250 | 15.50 |
| 500 | .500 | 32.00 |
| 1,000 | .125 | 15.30 |
| 1,000 | .250 | 31.75 |
| 1,400 | .125 | 22.75 |

It will be noted that, for a viscosity of 162 SUS, the delivery capability of the pump 60 is substantially proportional to the speed with which the pump is driven, i.e., the frequency and stroke with which the plunger 92 is reciprocated. It will also be noted that the pump 60 can be driven at speeds up to 1400 r.p.m. which is a very high speed for a reciprocating pump of such simple and inexpensive construction. However, it will be noted that, for a viscosity of 6600 SUS, the delivery capability of the pump 60 is substantially proportional to the speed with which the pump is driven only between 100–300 r.p.m. and at a stroke of .125 inch.

In the embodiment of FIG. 1, the pump 60 is used to push lubricating fluid to the top of the tube 54 from which its spews through the opening 58 onto the elements of the transmission system 14.

While we have illustrated and described our pump in conjunction with a gear motor, it will be understood that our pump is usable with any system comprising a plurality of driving and driven elements which must be lubricated. For this reason, the term "gear motor" as used in this specification is intended to define any system comprising a plurality of driving and driven elements such as normally found in a gear motor.

What is claimed is:

1. A pump comprising a housing member formed with a mounting flange, a boss on one side of said flange, a generally centrally located cavity in said boss and opening away from said flange, said cavity defining a perimetrally extending mounting surface on said boss and facing away from said flange, a first bore extending through said flange and boss and providing a first valve seat facing away from said flange, a second bore extending through said flange and boss and providing a second valve seat facing said flange, and a third bore extending through said flange and boss, a plunger arranged for axial reciprocation in said third bore, a plate disposed on said mounting surface and covering said cavity to define a pump chamber into which said bores open, a valve member for sealably engaging each valve seat, a valve spring yieldably urging each valve member into engagement with its respective valve seat, and a plunger spring yieldably urging said plunger away from said plate.

2. A pump as in claim 1 further comprising a sleeve rigidly and concentrically fastened in said third bore to extend outwardly from sadi flange, said plunger being disposed for axial reciprocation in said sleeve.

3. A pump as in claim 2 wherein said plunger is formed with a centrally located hollow therein and opening toward said plate, said plunger spring disposed in said hollow and bearing directly against said plate.

4. A pump as in claim 1 wherein said valve spring urging one of said valve members against said first valve seat is a conical spring, the base of which bears directly against said plate.

5. A pump as in claim 1 comprising a spring washer frictionally engaging the side wall of said second bore and retaining said valve spring urging one of said valve members against said second valve seat.

6. A pump as in claim 3 wherein said valve spring urging one of said valve members against said first valve seat is a conical spring, the base of which bears directly against said plate, and a spring washer frictionally engaging the side wall of said second bore and retaining said valve spring urging the other valve member against said second valve seat.

7. A pump as in claim 6 wherein said sleeve is fabricated from metal and wherein said member is die cast about said sleeve.

8. A pump as in claim 6 wherein said cavity is formed to extend generally parallel with said flange, said cavity having a depth approximately equal to one-eighth of the travel of said plunger, the combined thickness of said flange and said boss being approximately equal to two-thirds the travel of said plunger.

9. A pump comprising a housing member formed with a centrally located cavity in one face thereof, said cavity defining a perimetrally extending mounting boss, a first bore extending therethrough and generally perpendicularly to said one face, said first bore providing a first valve seat facing said one face, a second bore extending therethrough and generally parallel to said first bore, said second bore providing a second valve seat facing away from said one face, and a third bore extending therethrough and generally parallel to said first bore, a plunger arranged for axial reciprocation in said third bore, a plate mounted on said mounting boss and covering said cavity to define a pump chamber into which said bores open, a first ball for sealably engaging said first valve seat, a first valve spring yielding urging said first ball into engagement with said first valve seat, said first valve spring bearing directly on said plate, a second ball for sealably engaging said second valve seat, a second valve spring yieldably urging said second ball into engagement with said second valve seat, and a plunger spring, said plunger spring being disposed between said plunger, and said plate yieldably to urge said plunger away from said plate.

10. A pump as in claim 9 comprising a metal sleeve axially disposed in said third bore to extend outwardly from said housing member, said plunger being arranged for axial reciprocation in said sleeve, said housing member being die cast about said sleeve to be connected rigidly thereto.

11. A pump as in claim 10 wherein said plunger is formed with a centrally disposed, axially extending hollow opening toward said plate, said plunger spring being disposed partially in said hollow to bear against said plate.

References Cited
UNITED STATES PATENTS

| | | | |
|---|---|---|---|
| 1,355,285 | 10/1920 | Stanton | 103—153 |
| 1,661,886 | 3/1928 | Eisenhauer | 103—153 |
| 1,743,584 | 1/1930 | Wiltse | 103—153 |

FOREIGN PATENTS

| | | |
|---|---|---|
| 911,805 | 4/1946 | France. |
| 1,351,516 | 12/1963 | France. |

HENRY F. RADUAZO, Primary Examiner

U.S. Cl. X.R.

92—135, 161; 184—36; 417—415